(12) United States Patent
Kalogiros et al.

(10) Patent No.: US 12,235,375 B2
(45) Date of Patent: Feb. 25, 2025

(54) METHOD AND POSITIONING ENGINE FOR DETERMINING A POSITION OF A MOBILE DEVICE

(71) Applicant: u-blox AG, Thalwil (CH)

(72) Inventors: Dimitris Kalogiros, Thalwil (CH); Ioannis Sarris, Thalwil (CH); Matthias Mahlig, Thalwil (CH); Stelios Papaharalabos, Thalwil (CH)

(73) Assignee: u-blox AG, Thalwil (CH)

( * ) Notice: Subject to any disclaimer, the term of this patent is extended or adjusted under 35 U.S.C. 154(b) by 352 days.

(21) Appl. No.: 17/947,754

(22) Filed: Sep. 19, 2022

(65) Prior Publication Data

US 2023/0091448 A1    Mar. 23, 2023

(30) Foreign Application Priority Data

Sep. 20, 2021  (EP) ..................................... 21197751

(51) Int. Cl.
*H04W 4/02*    (2018.01)
*G01S 5/02*    (2010.01)
(Continued)

(52) U.S. Cl.
CPC .............. *G01S 5/0278* (2013.01); *G01S 5/14* (2013.01); *G06F 17/17* (2013.01); *H04B 17/318* (2015.01); *H04W 4/023* (2013.01); *H04W 4/025* (2013.01)

(58) Field of Classification Search
CPC ................ H04W 4/02; G01S 5/02; G01S 5/14
See application file for complete search history.

(56) References Cited

U.S. PATENT DOCUMENTS 8,149,162 B1    4/2012  Pauls
8,406,785 B2    3/2013  Alizadeh-Shabdiz et al.
(Continued)

OTHER PUBLICATIONS

European Extended Search Report in European Appln. No. 21197751.7, dated Jun. 1, 2022, 5 pages.

*Primary Examiner* — Michael T Vu
(74) *Attorney, Agent, or Firm* — Fish & Richardson P.C.

(57) ABSTRACT

An example method of determining a position of a mobile device includes, for each of a plurality of anchor points, receiving respective relative position information between the respective anchor point and the mobile device such that the received relative position information for the plurality of anchor points forms a set of position information, each relative position information including at least one of: a direction between the respective anchor point and the mobile device, a distance between the respective anchor point and the mobile device, or a direction and a distance between the respective anchor point and the mobile device. The method includes determining an estimated position of the mobile device based on the set of position information; defining a set of loci, each locus of the set of loci being based on one or more of the relative position information from the set of position information; determining, for each locus of the set of loci, a distance value between the estimated position of the mobile device and the respective locus; determining, for each locus of the set of loci, a weight factor as a function of the determined distance values; and determining a refined position of the mobile device based on the set of position information and the determined weight factors. A positioning engine for determining a position of a mobile device is disclosed as well.

14 Claims, 7 Drawing Sheets

(51) Int. Cl.
    *G01S 5/14*     (2006.01)
    *G06F 17/17*     (2006.01)
    *H04B 17/318*     (2015.01)

(56) References Cited

U.S. PATENT DOCUMENTS

| | | | |
|---|---|---|---|
| 2012/0058733 A1* | 3/2012 | Jovicic | G01S 5/0027 |
| | | | 455/67.11 |
| 2017/0356979 A1 | 12/2017 | Georgiou et al. | |
| 2019/0129446 A1* | 5/2019 | Kaufmann | G01S 19/46 |
| 2022/0248366 A1* | 8/2022 | Bao | H04W 64/006 |

* cited by examiner

METHOD AND POSITIONING ENGINE FOR DETERMINING A POSITION OF A MOBILE DEVICE

CROSS-REFERENCE TO RELATED APPLICATIONS

This application claims the benefit of priority to European Application No. 21197751.7, filed on Sep. 20, 2021, the contents of which are hereby incorporated by reference.

TECHNICAL FIELD

This disclosure relates to a method and to a positioning engine for determining a position of a mobile device. The disclosure further relates to a computer program product and a non-volatile storage medium.

BACKGROUND ART

In many applications like indoor positioning systems, IPS, or real-time location services, RTLS, one key element is to determine a position of a mobile device like a tag based on position information relative to multiple anchor points. Such determination is for example performed in a positioning engine using various mathematical models.

In conventional approaches, an accuracy of the determined position of the mobile device depends on the accuracy of the relative position information of each anchor point only. Hence, if an anchor point provides wrong or inaccurate relative position information for various reasons, the determined position of the mobile device will be less accurate too.

SUMMARY OF INVENTION

An object to be achieved is to provide an improved processing concept that allows an improved determination of a position of a mobile device with a higher accuracy.

This object is achieved with the subject-matter of the independent claims. Embodiments and developments derive from the dependent claims.

According to the present disclosure, determination of a position of a mobile device includes, for each of a plurality of anchor points, receiving respective relative position information between the respective anchor point and the mobile device such that the received relative position information for the plurality of anchor points forms a set of position information. Each relative position information includes one of i) a direction between the respective anchor point and the mobile device, ii) a distance between the respective anchor point and the mobile device, and iii) a direction and a distance between the respective anchor point and the mobile device. Directions are assumed to be defined in 3-dimensional, 3D, space.

The improved processing concept is based on the insight that initially an estimated position of the mobile device is determined based on the set of position information. Such an estimated position may be subject to inaccuracies due to wrong or inaccurate relative position information in the set of position information. To account for such inaccuracies of the respective anchor points, weight factors are introduced that reduce the influence of the inaccurate relative position information on the overall determined position of the mobile device.

To this end, the relative position information of the plurality of anchor points is evaluated with respect to the estimated position of the mobile device. In particular, depending on the type of relative position information as described above, each one or two of the relative position information defines a locus for possible positions of the mobile device. In this disclosure, a locus, plural 'loci', is a set of all points, commonly a line, a line segment, a curve or a plane, whose location satisfies or is determined by one or more specified conditions that are e.g. given by respective equations. Here, the specified conditions are given by the relative position information. According to the improved processing concept, it is assumed that the accuracy of the relative position information decreases with a distance between the estimated position and the locus. Hence, the weight factors are determined according to such a dependency and a refined position of the mobile device can be determined based on a set of position information and the determined weight factors.

Due to the applied weight factors, the influence of less accurate relative position information is decreased such that the refined position will be closer to the actual ground truth position of the mobile device.

In some implementations of the improved processing concept, the process may be performed iteratively such that, for example in a subsequent iteration step, the refined position of the previous iteration step is used as the estimated position such that the determination of the distance values of the loci to the estimated position and the respective determination of the weight factors is based on the previously determined refined position of the mobile device. This can further increase accuracy. The iteration can be performed for a predetermined number of iteration steps or until an exit criterion is achieved.

In an embodiment of a method for determining a position of a mobile device according to the improved processing concept, after receiving the set of position information and determining an estimated position of the mobile device based on the set of position information, a set of loci is defined, each locus of the set of loci being based on one or more of the relative position information from the set of position information. For each locus of the set of loci, a distance value between the estimated position of the mobile device and the respective locus is determined. Furthermore, for each locus of the set of loci, a weight factor is determined as a function of the determined distance values. A refined position of the mobile device is determined based on the set of position information and the determined weight factors.

For example, the determination of the estimated position of the mobile device is performed with a linear equation system solved with a least squares, LS, approach. Furthermore, the determination of the refined position of the mobile device may be performed with the linear equation system solved with a weighted least squares, WLS, approach based on the determined weight factors. For example, the WLS approach employs a diagonal weight matrix formed from the determined weight factors.

In various embodiments the distance values may be determined as the distances, e.g. geometrical distances, between the estimated position of the mobile device and the respective locus. In alternative implementations, the distance values are determined as squared distances, e.g. geometrical distances, between the estimated position of the mobile device and the respective locus. The use of squared distances may reduce the computational effort of the determination since, for example, square root calculations may be avoided.

In various implementations, the function determining the weight factor for each locus of the set of loci as a function of the determined distance values, is monotonically decreasing or strictly decreasing with respect to the associated distance value of the respective locus. For example, the larger the distance value for one locus, the smaller will be the weight factor for that locus, and vice versa.

Generally, the weight factors may be in the range between 0 and 1, such that, for example, for a weight factor of 0, the respective locus is completely ignored while for a weight factor of 1, the locus is completely taken into account.

Various functions for determining the weight factors are available depending, for example, on the minimum distance value of all distance values of the loci, a sum of all distance values of all loci, a distance threshold value and the distance value for the actual locus. This may be combined with closed form functions employing exponential values. In some implementations the functions may be pre-calculated and stored in a lookup table, LUT, such that the resulting weight factor is retrieved from the LUT based on their actual distance value.

In various implementations the refined position of the mobile device is determined further based on quality information for at least one of the plurality of anchor points. For example, the quality information for the at least one anchor point is determined from at least one of the following: a signal strength associated with the received relative position of the at least one anchor point, a number of antenna elements of the at least one anchor point, a confidence factor associated with the received relative position of the at least one anchor point, upper and/or lower bounds for the weight factor associated with the at least one anchor point.

For example, if a WLS approach is chosen for determining the refined position of the mobile device, the quality information may be mapped to one or more respective weight matrices, which preferably have the same form as the weight matrices with weight factors determined from the distance values.

As mentioned before, the method may be performed in an iterative fashion such that in an initial iteration step the estimated position is determined based on the set of position information and in each subsequent iteration step the refined position determined in a respective preceding iteration is used as the estimated position for determining the distance values and the weight factors.

Preferably, an absolute position of each of the plurality of anchor points is known.

For example, the method is performed in a positioning engine. Such a positioning engine may be a local positioning engine being located in the same area as the anchor points. However, the positioning engine may also be implemented as a service component in a network cloud.

For example, a positioning engine for determining a position of a mobile device according to the improved processing concept comprises a receiver and a processing unit. The receiver is configured for receiving from each of a plurality of anchor points, respective relative position information between the respective anchor point and a mobile device. The received relative position information for the plurality of anchor points forms a set of position information. Each relative position information is of the form as described above.

The processing unit is configured for determining an estimated position of the mobile device based on the set of position information, defining a set of loci, each locus of the set of loci being based on one or more of the relative position information from the set of position information, determining, for each locus of the set of loci, a distance value between the estimated position of the mobile device and the respective locus, determining, for each locus of the set of loci, a weight factor as a function of the determined distance values, and determining a refined position of the mobile device based on the set of position information and the determined weight factors.

Further implementations of the positioning engine become apparent for the skilled reader from the various implementations of the method described above.

A positioning engine as described above together with a plurality of anchor points and, optionally, one or more mobile devices like tags, forms a positioning system, for example.

According to one embodiment of the improved processing concept, a computer program product for determining a position of a mobile device comprises instructions that may be stored in a preferably non-transitory computer-readable storage medium, the instructions enabling a computer system to execute a method according to one of the implementations described above. The computer system may be implemented within a positioning engine.

Furthermore, a computer system may have a processor and a storage medium having computer program instructions stored therein, enabling the processor to execute a method according to one of the implementations described above.

BRIEF DESCRIPTION OF DRAWINGS

The improved processing concept will be explained in more detail in the following with the aid of the drawings. Elements and functional blocks having the same or similar function bear the same reference numerals throughout the drawings. Hence their description is not necessarily repeated in following drawings.

In the drawings.

DETAILED DESCRIPTION

Figure 1:
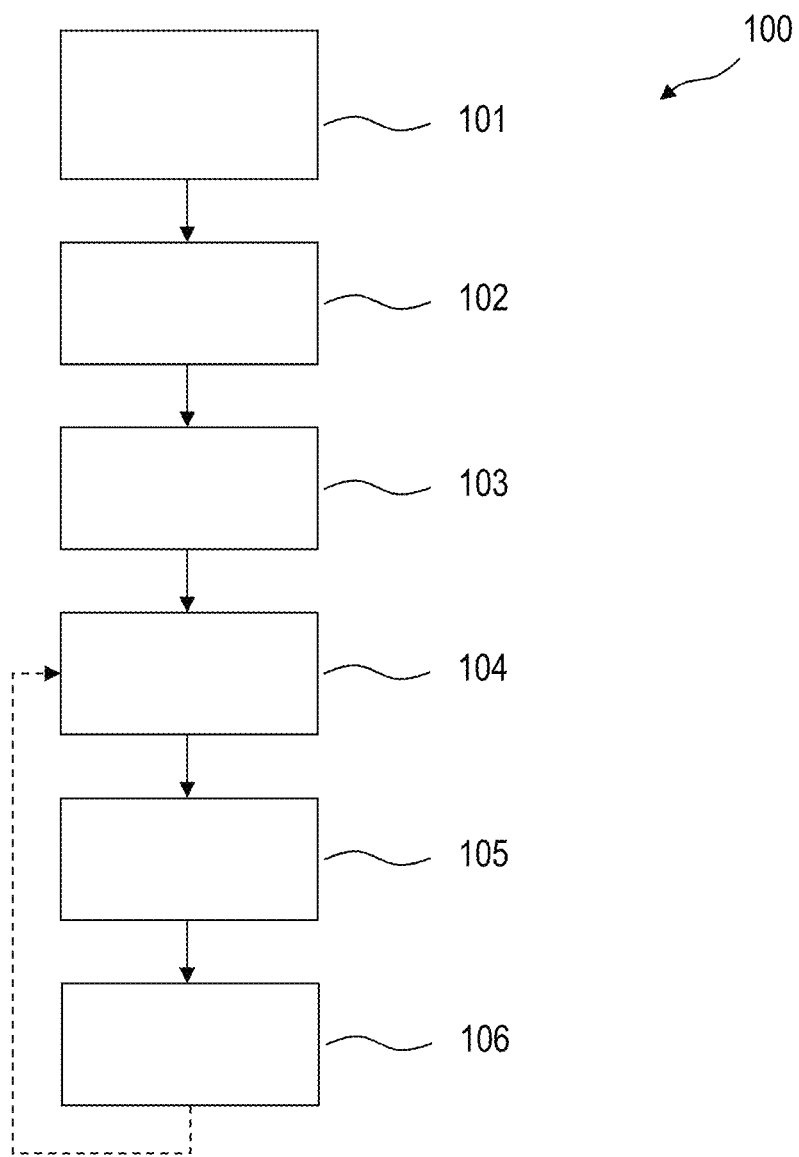
FIG. 1 shows a flowchart of a method for determining a position of a mobile device.

FIG. 1 shows a flow diagram of an example implementation of a method 100 for determining a position of a mobile device. The mobile device can be a tag that transmits or receives a radio frequency, RF, signal, like a Bluetooth direction finding signal, which includes a constant tone extension packet, CTE. Other RF signals like Wi-Fi signals, Ultra-wideband, UWB, or cellular signals could be used as an alternative, for example. Such signals are transmitted between the mobile device and a plurality of anchor points.

Figure 2:
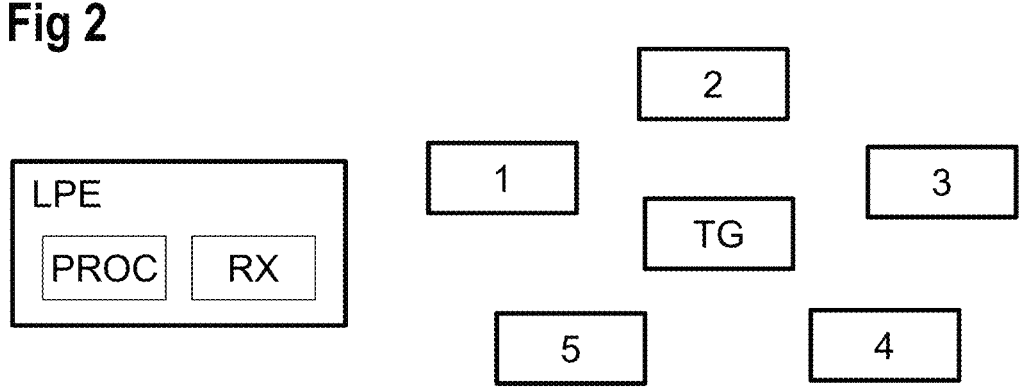
FIG. 2 shows an example of a positioning system.

Referring now to FIG. 2, an example of a positioning system is shown comprising a positioning engine LPE that includes a processing unit PROC and a receiver RX. Furthermore, the positioning system includes a plurality of anchor points 1, 2, 3, 4, 5. FIG. 2 further shows a mobile device TG that further may be comprised by the positioning system. It should be noted that in some implementations the positioning engine LPE can be placed inside one of the anchor points 1-5 or inside the mobile device TG, or even in a network cloud. By transmitting respective signals between the mobile device TG and each of the anchor points 1-5 as described above, relative position information for each of the anchor points 1-5 can be determined by the respective anchor point and/or the mobile device TG. Such relative position information includes one of i) a direction between the respective anchor point and the mobile device, ii) a distance between the respective anchor point and the mobile device TG, and iii) a direction and distance between the respective anchor point and the mobile device TG. Respective measures for determining such relative position information are known to the skilled person and therefore not described in more detail here.

Referring back to FIG. 1, in step 101, for each of the plurality of anchor points 1-5 the respective relative position information between the respective anchor point and the mobile device TG is received, for example by the receiver RX of the positioning engine LPE, such that the received relative position information for the plurality of anchor points 1-5 forms a set of position information.

Further method steps 102 to 106 may be carried out by the processing unit PROC of the positioning engine LPE.

It should be noted that the number of five anchor points chosen in the example of FIG. 2 should not be limiting and a smaller or greater number of anchor points could be used without loss of generality. The lower limit of anchor points is e.g. two if direction is included in the relative position information, and e.g. four if only a distance is included in the relative position information received for an anchor point. Generally, the lower limit depends on the type of relative position information provided by the anchor points to be used, which in detail will be apparent to the skilled reader from the above description.

A direction may be defined as a directional vector or as a 3D angle of arrival, AoA, or 3D angle of departure, AoD.

Figure 3:
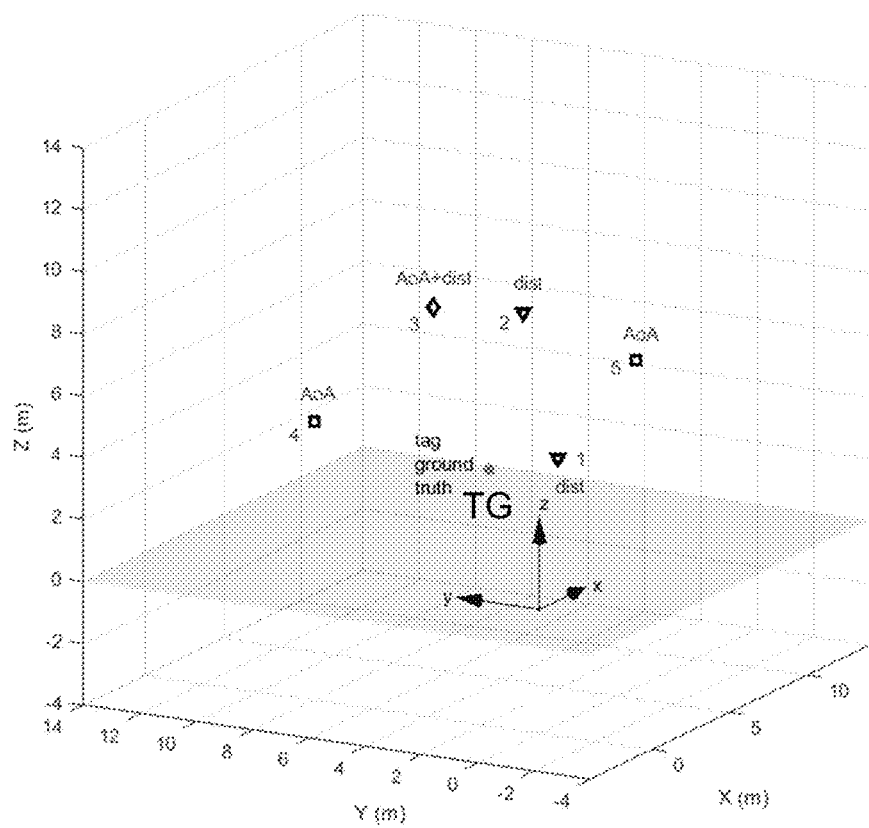
FIG. 3 shows an example 3D view of anchor points and a mobile device.

Referring now to FIG. 3, an example 3D view of the anchor points 1-5 and a mobile device TG is shown, in particular in a 3D coordinate system. In this example, anchor point 1 and anchor point 2 are each able to provide relative position information including a distance between the anchor points 1, 2 and the mobile device TG. The mobile device TG is shown at its ground truth position. For anchor point 3, the relative position information includes both a direction and a distance between the anchor point 3 and the mobile device TG. For anchor points 4 and 5, the relative position information includes only a direction between the respective anchor points 4, 5 and the mobile device TG, e.g. derived from respective AoA measurements.

In this example the case is assumed where the mobile device TG is moving around a room and the anchor points 1-5 are responsible for measuring the distance and/or the AoA/AoD among them and the mobile device TG. A position of the anchor points 1-5 is assumed to be known. Furthermore, each measurement of distance and/or AoA/AoD is being conducted or transformed in such a way with respect to a global coordinate frame that characterizes the room under examination.

Figure 4:
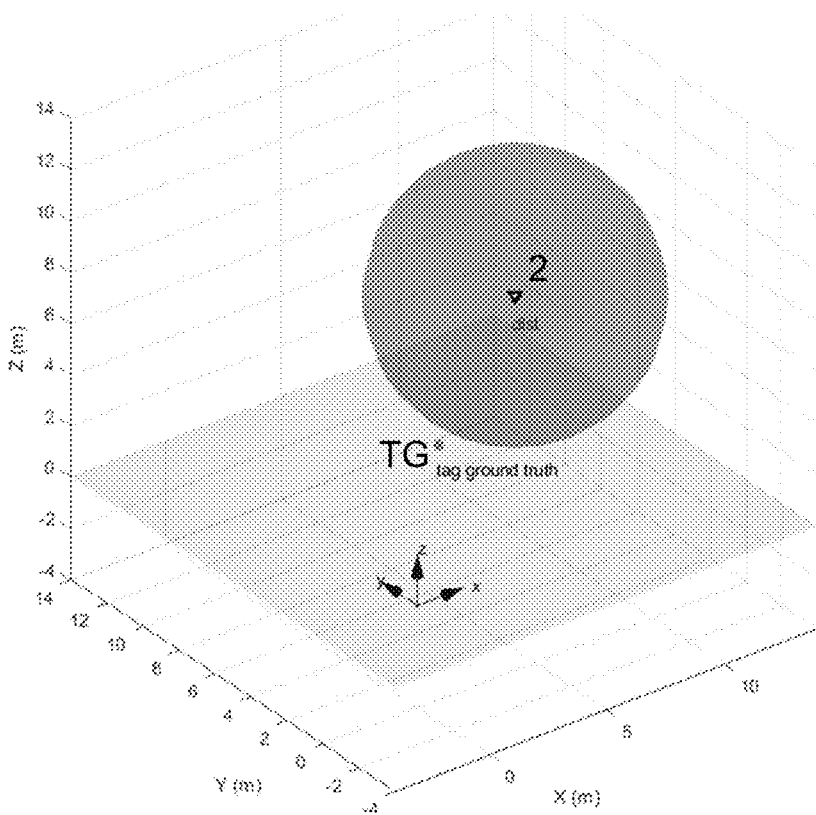
FIG. 4 shows an example 3D view of an anchor point and a mobile device with a distance sphere.

Referring now to FIG. 4, an example 3D view of an anchor point and a mobile device is shown. This anchor point 2, for example, measures only a distance. An anchor point that measures distance can be, for example, an UWB anchor point or a Bluetooth access point or a Wi-Fi router or any other device capable of estimating a distance between itself and the presumably moving target. However, it has to be assumed that due to AWGN, multipath, obstacles in the line of sight and other factors, the measured distance is erroneous. As shown in FIG. 4, by measuring a distance, an anchor defines a sphere, also called a distance sphere, where the center of the sphere is the anchor point 2 itself and the radius equals the measured distance.

Let us suppose that the Anchor $A_i$ is located at the point $x_i,y_i,z_i$ and measures a distance $d_i$. Then, the equation of the distance sphere is given by equation (1), where every quantity is expressed with respect to the room-global coordinate system that is depicted in FIG. 3.

$$\text{Anchor point:} A_i(x_i, y_i, z_i) \qquad (1)$$
$$(x - x_i)^2 + (y - y_i)^2 + (z - z_i)^2 = d_i^2$$

Figure 5:
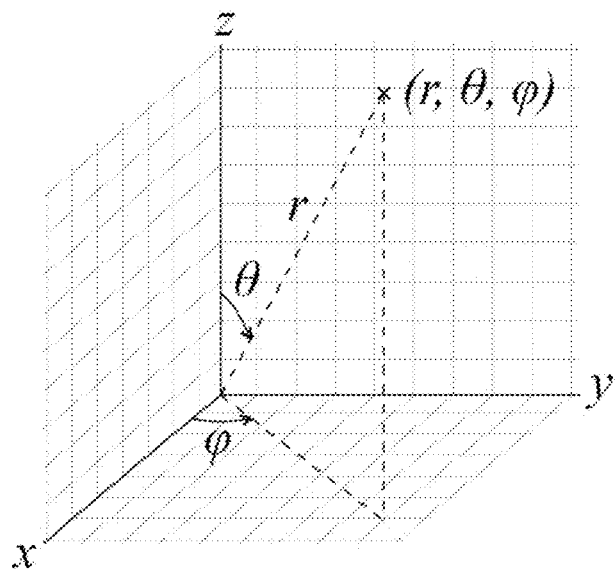
FIG. 5 shows an example vector with a spherical coordinates definition.

Referring now to FIG. 5, a definition of spherical coordinates is shown that is going to be used in this disclosure.

In mathematics, a spherical coordinate system is a coordinate system for three-dimensional space where the position of a point is specified by three numbers: the radial distance r of that point from a fixed origin, its polar angle θ measured from a fixed zenith direction, and the azimuthal angle φ of its orthogonal projection on a reference plane that passes through the origin and is orthogonal to the zenith, measured from a fixed reference direction on that plane.

The spherical coordinates vary at the following range:

$$r \geq 0 \qquad (2)$$
$$0 \leq \theta \leq \pi$$
$$0 \leq \varphi < 2\pi \text{ or } -\pi < \varphi \leq \pi$$

Figure 6:
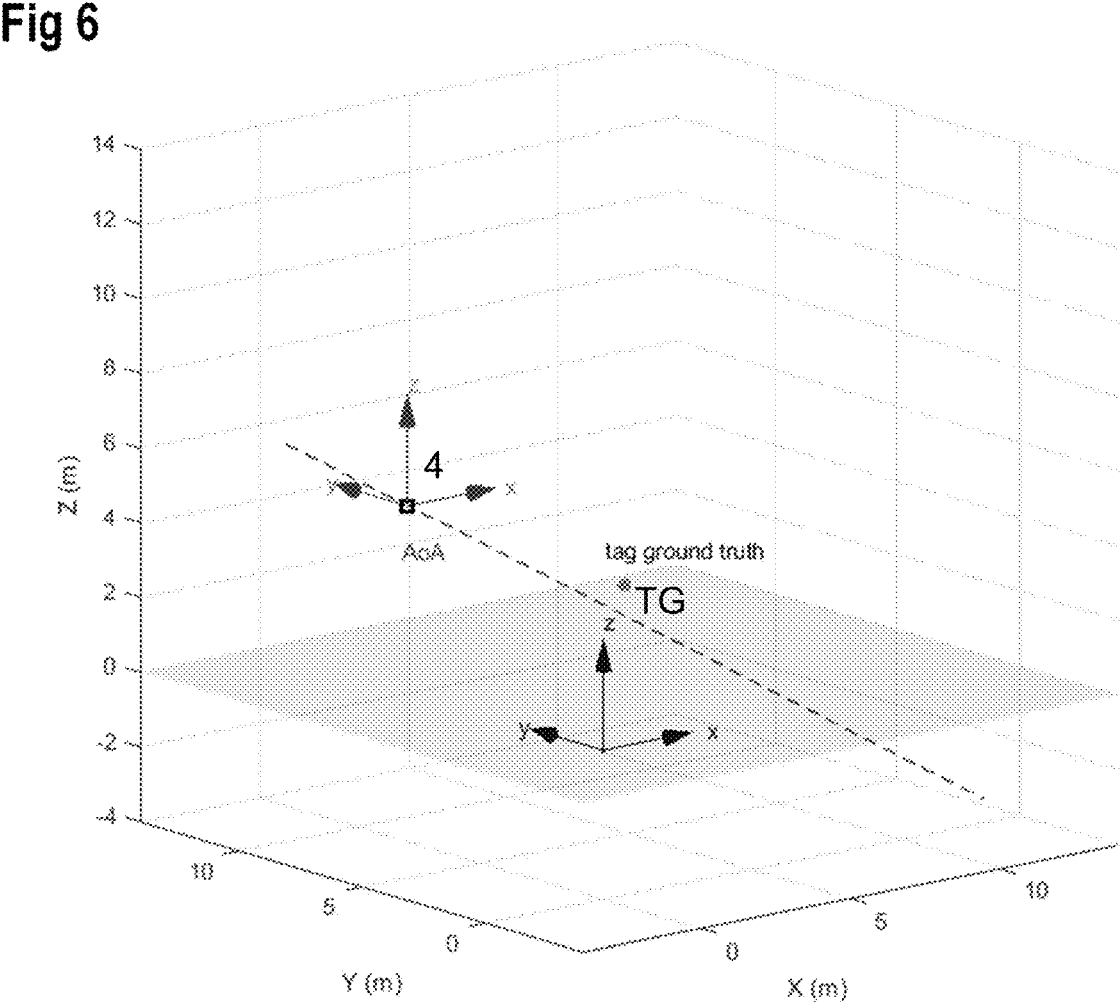
FIG. 6 shows an example 3D view of an anchor point and a mobile device with a line locus.

Referring now to FIG. 6, anchor point 4 is shown that measures a direction between itself and the mobile device TG.

For example, such an anchor point, after the appropriate coordinate transformations, provides two angles φ and θ which are the spherical coordinates of the target, except of the "r". These two angles are measured with respect to the global coordinate axes that have been transferred to the anchor's position without changing its orientation.

The direction on which the target is located, relative to the anchor point's position is given by the directional vector $\vec{\delta}_i$ which is defined in equation (3):

$$\text{Measured angles:} \qquad (3)$$
$$\varphi_i, \theta_i \ \vec{\delta}_i = \begin{bmatrix} \delta_{ix} \\ \delta_{iy} \\ \delta_{iz} \end{bmatrix} = \begin{bmatrix} \cos\varphi_i \cdot \sin\theta_i \\ \sin\varphi_i \cdot \sin\theta_i \\ \cos\theta_i \end{bmatrix}$$

Directional vector $\vec{\delta}_i$ defines completely a 3D straight line which contains the anchor and the tag, provided that no error has occurred.

Let us suppose that the tag and the anchor are located at the points T(x,y,x) and respectively. Then we can assert that $$\overrightarrow{A_i T} = \begin{bmatrix} x - x_i \\ y - y_i \\ z - z_i \end{bmatrix}, \vec{\delta}_i = \begin{bmatrix} \delta_{ix} \\ \delta_{iy} \\ \delta_{iz} \end{bmatrix} \quad (4)$$

$$\boxed{\overrightarrow{A_i T} \parallel \vec{\delta}_i} \Rightarrow \begin{cases} \dfrac{x - x_i}{y - y_i} = \dfrac{\delta_{ix}}{\delta_{iy}} \\ \dfrac{y - y_i}{z - z_i} = \dfrac{\delta_{iy}}{\delta_{iz}} \end{cases} \Rightarrow \boxed{\begin{cases} \delta_{iy} x - \delta_{ix} y = \delta_{iy} x_i - \delta_{ix} y_i \\ \delta_{iz} y - \delta_{iy} z = \delta_{iz} y_i - \delta_{iy} z_i \end{cases}}$$

The last equation (4) represents the aforementioned 3D straight line which is depicted in FIG. 6.

Figure 7:
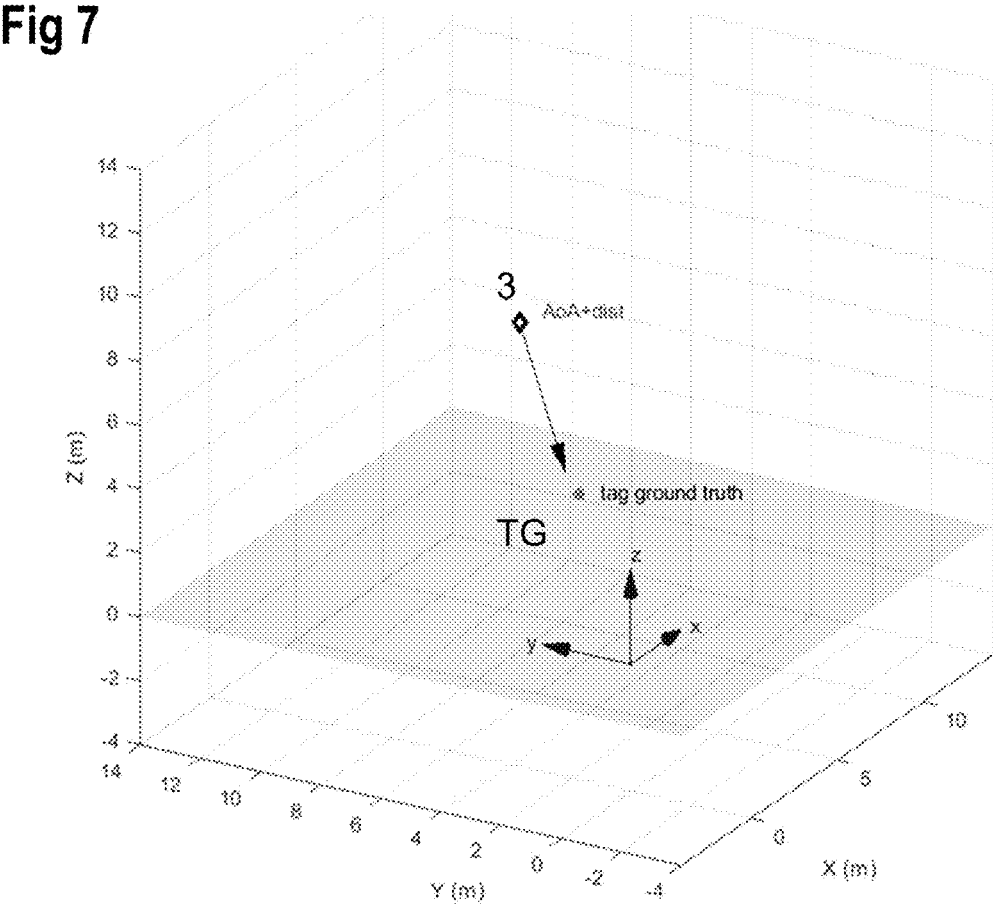
FIG. 7 shows an example 3D view of an anchor point and a mobile device with a (relative) positional vector.

Referring now to FIG. 7, an example 3D view of anchor point 3 and the mobile device TG with a directional vector is shown. Anchor point 3 is able to measure both distance and AoA. For example, a Bluetooth access point which is equipped with an antenna array, is capable to measure both types of information.

In this case, the anchor point 3 is a combination of the previous scenarios and based on equation (3), this anchor point determines a relative positional vector that is pointing to the target, respectively to the mobile device TG.

Indeed, if we suppose that the anchor $A_i$ is located at the point $(x_i, y_i, z_i)$ and measures a distance $d_i$ and the two angles $\varphi_i$ and $\theta_i$, then we can derive the following equation:

Measured distance:
$d_i$
Measured angles:
$\varphi_i, \theta_i$ $$\vec{\Delta}_i = d_i \cdot \vec{\delta}_i = \begin{bmatrix} \Delta_{ix} \\ \Delta_{iy} \\ \Delta_{iz} \end{bmatrix} = \begin{bmatrix} d_i \cdot \cos\varphi_i \cdot \sin\theta_i \\ d_i \cdot \sin\varphi_i \cdot \sin\theta_i \\ d_i \cdot \cos\theta_i \end{bmatrix} \quad (5)$$

If there is zero impact from multipath effects, AWGN, etc., then the positional vector $\vec{\Delta}_i$, which can also be called a relative positional vector, should point exactly at the location of the target.

Referring back to FIG. 1, step 102, an estimated position of the mobile device TG is determined, e.g. with processing unit PROC, based on the set of position information. To this end, the information being measured by the anchor points 1 to 5 of this example is exploited. A well-known method is to use equations (1), (4), (5) in order to create a system of linear equations and to use an LS approach in order to solve it. This should be demonstrated using the example configuration of FIG. 3, where all types of anchor points are present. The following table summarizes the details of all the anchor points 1 to 5.

| NO. | TYPE | COORDINATES | MEASUREMENTS |
|---|---|---|---|
| 1 | Distance | $A_1 (x_1, y_1, z_1)$ | $d_1$ |
| 2 | Distance | $A_2 (x_2, y_2, z_2)$ | $d_2$ |
| 3 | Distance and direction | $A_3 (x_3, y_3, z_3)$ | $d_3, \varphi_3, \theta_3$ |
| 4 | direction | $A_4 (x_4, y_4, z_4)$ | $\varphi_4, \theta_4$ |
| 5 | direction | $A_5 (x_5, y_5, z_5)$ | $\varphi_5, \theta_5$ |

Of particular interest are the anchor points 1 and 2, which measure distance and define spheres given by equation (1). In order to use these anchor points, one must combine a pair of them each time and create a useful linear equation. In the present example there are only two of them, so we have the following algebraic manipulations:

$$(1) \Rightarrow \begin{cases} (x - x_1)^2 + (y - y_1)^2 + (z - z_1)^2 = d_1^2 \\ (x - x_2)^2 + (y - y_2)^2 + (z - z_2)^2 = d_2^2 \end{cases} \quad (6)$$

$$\Rightarrow \begin{cases} (x^2 - 2x_1 x + x_1^2) + (y^2 - 2y_1 y + y_1^2) + (z^2 - 2z_1 z + z_1^2) = d_1^2 \\ (x^2 - 2x_2 x + x_2^2) + (y^2 - 2y_2 y + y_2^2) + (z^2 - 2z_2 z + z_2^2) = d_2^2 \end{cases}$$

$$\stackrel{(-)}{\Longrightarrow} \boxed{\begin{array}{l} 2(x_2 - x_1)x + 2(y_2 - y_1)y + 2(z_2 - z_1)z \\ = (x_2^2 - x_1^2) + (y_2^2 - y_1^2) + (z_2^2 - z_1^2) - (d_2^2 - d_1^2) \end{array}}$$

Figure 8:
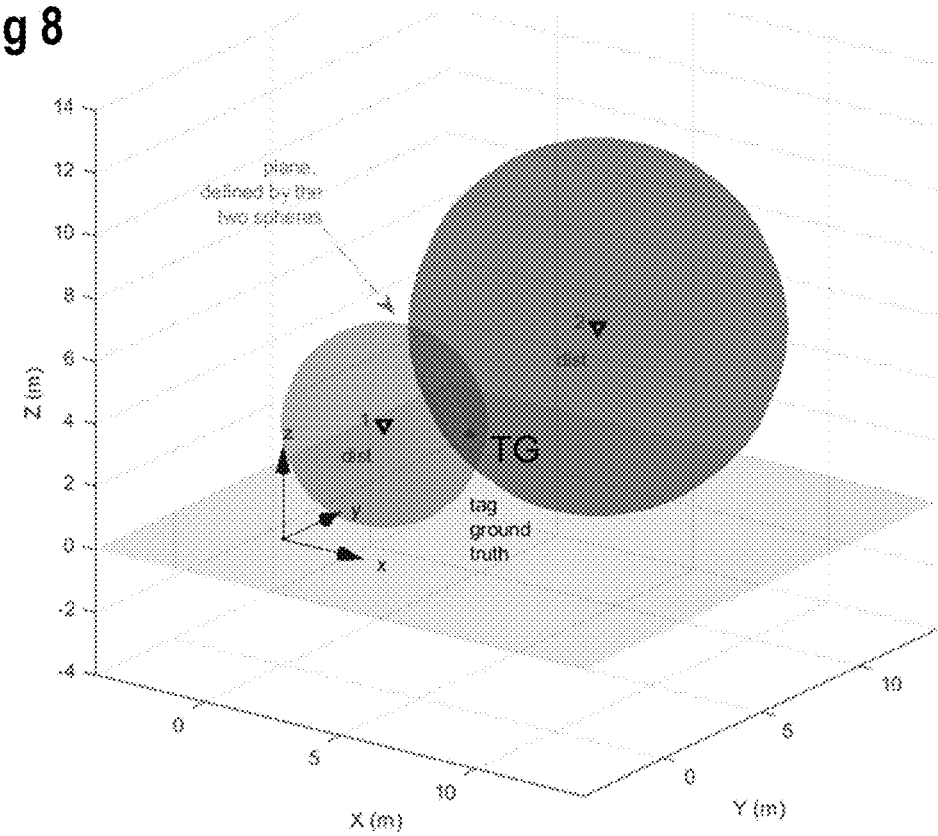
FIG. 8 shows an example 3D view of two anchor points and a mobile device with respective distance spheres.

The last equation (6), in general, represents a plane in the 3D space. Referring now to FIG. 8, this plane, in the case where the spheres of anchor points 1 and 2 are intersected, contains the circle consisting of the common points of the two spheres shown in FIG. 8.

Before combining all equations from all kind of anchors, we have to normalize the equations that represent planes in the 3D-space. Namely, we transform equation (6) as follows. First we define the scaling factor $SF_{12}$ for the plane equation (6), defined by anchors 1 and 2, see equation (7), and then we normalize, see equation (8).

$$SF_{12} = 2\sqrt{(x_2 - x_1)^2 + (y_2 - y_1)^2 + (z_2 - z_1)^2} \quad (7)$$

$$\frac{2(x_2 - x_1)}{SF_{12}} x + \frac{2(y_2 - y_1)}{SF_{12}} y + \frac{2(z_2 - z_1)}{SF_{12}} z = \quad (8)$$

$$\frac{(x_2^2 - x_1^2) + (y_2^2 - y_1^2) + (z_2^2 - z_1^2) - (d_2^2 - d_1^2)}{SF_{12}}$$

So, combining all kind of anchors of our example, we get the following matrix equation (9) with the known coordinates of the anchors, $$A_i = \begin{bmatrix} x_i \\ y_i \\ z_i \end{bmatrix}, 1 \le i \le 5$$

and the unknown coordinates of the target $$X = \begin{bmatrix} x \\ y \\ z \end{bmatrix}. \quad (9)$$

$$\underbrace{\begin{bmatrix} \dfrac{2(x_2 - x_1)}{SF_{12}} & \dfrac{2(y_2 - y_1)}{SF_{12}} & \dfrac{2(z_2 - z_1)}{SF_{12}} \\ 1 & 0 & 0 \\ 0 & 1 & 0 \\ 0 & 0 & 1 \\ \delta_{4y} & -\delta_{4x} & 0 \\ 0 & \delta_{4z} & -\delta_{4y} \\ \delta_{5y} & -\delta_{5x} & 0 \\ 0 & \delta_{5z} & -\delta_{5y} \end{bmatrix}}_{H} \begin{bmatrix} x \\ y \\ z \end{bmatrix} =$$

-continued
$$\begin{bmatrix} \frac{(x_2^2 - x_1^2) + (y_2^2 - y_1^2) + (z_2^2 - z_1^2) - (d_2^2 - d_1^2)}{SF_{12}} \\ x_3 + \Delta_{3x} \\ y_3 + \Delta_{3y} \\ z_3 + \Delta_{3z} \\ \delta_{4y}x_4 - \delta_{4x}y_4 \\ \delta_{4z}y_4 - \delta_{4y}z_4 \\ \delta_{5y}x_5 - \delta_{5x}y_5 \\ \delta_{5k}y_5 - \delta_{5y}z_5 \end{bmatrix}$$
$B$ In the example of equation (9), the first row results from the distance information from anchors 1 and 2, rows 2-4 result from direction and distance information from anchor 3, and rows 5-8 result from the direction information from anchors 4 and 5, respectively. This also becomes apparent from the indices used.

Referring back to FIG. 1, step 102, a LS solution using pseudo-inverse can be applied for determining the estimated position $\hat{X}$ of the mobile device TG:

$$HX = B \Rightarrow \hat{X} = [(H^T H)^{-1} H^T] B \qquad (10)$$

Equation (10) is solved by assuming that all anchor points and all equations in the matrix equation (9) are of equal importance and have the same reliability. In the real world, this is not true. Several sources of errors make the equations that form the matrix equation (9), less or more reliable.

One approach is to use different weights for each equation. For example, in our case we can define a weight matrix and find the solution by using Weighted Least Square, WLS, algorithm.

In general, the idea of WLS, tailored to our example, is being illustrated as described in the following. An 8×8 diagonal weight matrix, such that, in general, each equation (here: 8) of the matrix equation (9) has its own weight.

$$W = \begin{bmatrix} w_1 & 0 & 0 & 0 & \cdots & 0 \\ 0 & w_2 & 0 & 0 & \cdots & 0 \\ 0 & 0 & w_3 & 0 & \cdots & 0 \\ 0 & 0 & 0 & w_4 & \cdots & 0 \\ \vdots & \vdots & \vdots & \vdots & \ddots & \vdots \\ 0 & 0 & 0 & 0 & 0 & w_8 \end{bmatrix}$$

Usage of the weight matrix W results in $$(HX = B) \xrightarrow[\text{LS solution}]{\text{weighted}} \hat{X}_w = [(H^T W H)^{-1} H^T W] B \qquad (11)$$

Of course, there are some critical issues. The most important of them are the following:
 how to define the weights to correspond to the equation's reliability; and
 how to estimate the values of the weights without waste an enormous amount of computational resources.

An indoor environment with many targets to follow inside it is not suitable for statistical models. Furthermore, trying to use memory and/or statistical models is extremely resource consuming when the number of tags increases.

With the improved processing concept it is proposed defining the weights, according to the distance of the estimated position and the locus defined by each anchor point or pair of anchor points, as described at the previous paragraphs.

It has already been described that each kind of anchor (or group of anchors) determines a specific locus for the target. The equations that describe each locus are the rows of the matrices H and B of the matrix equation (9) as mentioned above.

In our example, the correspondence between the type of the anchor(s), the type of the locus that is generated of each anchor type and the number of the equations which describes it in the 3D space, is summarized at the following table

| Type of Anchor | Number of anchors | Locus | Number of equations |
| --- | --- | --- | --- |
| Measuring distance | 2 | plane | 1 |
| Measuring AoA/AoD | 1 | line | 2 |
| Measuring distance + AoA/AoD | 1 | point | 3 |

Hence referring back to FIG. 1, in step 103, a set of loci is defined, each locus of the set of loci being based on one or more of the relative position information from the set of position information, e.g. according to the above table.

Furthermore, in step 104, for each locus of the set of loci, a distance value between the estimated position of the mobile device (TG) and the respective locus is determined.

This will be described in more detail in the following for the different possible configurations.

Distance between a point and a plane in the 3D space

Let us suppose that we want to determine the distance between the point $X_0(x_0, y_0, z_0)$ and the plane described by equation (8). The distance is given from the following with $A_1(x_1, y_1, z_1)$ and $A_2(x_2, y_2, z_2)$ being the positions of the anchor points 1 and 2 that measure distances $d_1$, $d_2$.

Assuming the following notations $$C_x = \frac{2(x_2 - x_1)}{SF_{12}},$$

$$C_y = \frac{2(y_2 - y_1)}{SF_{12}},$$

$$C_z = \frac{2(z_2 - z_1)}{SF_{12}},$$

$$C_0 = \frac{(x_2^2 - x_1^2) + (y_2^2 - y_1^2) + (z_2^2 - z_1^2)}{SF_{12}}$$

$$C_d = \frac{(d_2^2 - d_1^2)}{SF_{12}}$$

and the plane equation with respect to equation (8), $$C_x x + C_y y + C_z z = C_0 - C_d,$$

a distance $D_{plane}$ between the point $X_0(x_0, y_0, z_0)$ and the plane results to $$D_{plane} = \frac{|C_x x_0 + C_y y_0 + C_z z_0 - C_0 + C_d|}{\sqrt{C_x^2 + C_y^2 + C_z^2}} \qquad (12)$$

The quantities $C_x$, $C_y$, $C_z$, $C_0$, $SF_{12}$ and $\sqrt{C_x^2 + C_y^2 + C_z^2}$ depend on the anchor points only. This observation allows us to predetermine them and simplify the computational effort of such a distance calculation, resulting in the following equation (13):

$$D_{plane} = |C'_x x_0 + C'_0 C'_y y_0 + C'_z z_0 - C'_0 + C'_d (d_2^2 - d_1^2)| \quad (13)$$

Herein the following predefined coefficients are used:

$$C'_x = \frac{c_x}{\sqrt{c_x^2 + c_y^2 + c_z^2}},$$

$$C'_y = \frac{c_y}{\sqrt{c_x^2 + c_y^2 + c_z^2}},$$

$$C'_z = \frac{c_z}{\sqrt{c_x^2 + c_y^2 + c_z^2}},$$

$$C'_0 = \frac{c_0}{\sqrt{c_x^2 + c_y^2 + c_z^2}},$$

$$C'_d = \frac{1}{SF_{12}\sqrt{c_x^2 + c_y^2 + c_z^2}},$$

Distance Between Two Points in the 3D Space

Let us suppose that we want to determine the distance between the point $X_0(x_0, y_0, z_0)$ and the point defined by the vector $\vec{\Delta}_3$ for anchor point 3 as described above. The distance is given from the following equations. With $A_3(x_3, y_3, z_3)$ being the position of the anchor point 3, and measured distance $d_3$ and measured angles $\varphi_3$, $\theta_3$, the vector $\vec{\Delta}_3$ for anchor point 3 is defined as $$\vec{\Delta}_3 = d_3 \cdot \vec{\delta}_3 = \begin{bmatrix} \Delta_{3x} \\ \Delta_{3y} \\ \Delta_{3z} \end{bmatrix} = \begin{bmatrix} d_3 \cdot \cos\varphi_3 \cdot \sin\theta_3 \\ d_3 \cdot \sin\varphi_3 \cdot \sin\theta_3 \\ d_3 \cdot \cos\theta_3 \end{bmatrix}.$$

The distance $D_{point}$ between the two points therefore results in:

$$D_{point} = \sqrt{[x_0 - (x_3 + \Delta_{3x})]^2 + [y_0 - (y_3 + \Delta_{3y})]^2 + [z_0 - (z_3 + \Delta_{3z})]^2} \quad (14)$$

Distance Between a Point and a Line in the 3D Space

The distance between the point $X_0(x_0, y_0, z_0)$ and the line defined by equation (4) is given by equation (15) below, using anchor point 4 of our example.

With $A_4(x_4, y_4, z_4)$ being the position of the anchor point 4, and measured angles $\varphi_4$, $\theta_4$, vector $\vec{\delta}_4$ and the vector $\overrightarrow{A_4 X_0}$ result to:

$$\vec{\delta}_4 = \begin{bmatrix} \delta_{4x} \\ \delta_{4y} \\ \delta_{4z} \end{bmatrix} = \begin{bmatrix} \cos\varphi_4 \cdot \sin\theta_4 \\ \sin\varphi_4 \cdot \sin\theta_4 \\ \cos\theta_4 \end{bmatrix}$$

$$\overrightarrow{A_4 X_0} = \begin{bmatrix} x_0 - x_4 \\ y_0 - y_4 \\ z_0 - z_4 \end{bmatrix}$$

The distance $D_{line}$ between the point and the line therefore results in:

$$D_{line} = \frac{\left\|\overrightarrow{A_4 X_0} \times \vec{\delta}_4\right\|}{\|\vec{\delta}_4\|} \xrightarrow{\|\vec{\delta}_4\|=1} D_{line} = \left\|\overrightarrow{A_4 X_0} \times \vec{\delta}_4\right\| \quad (15)$$

At the last step, to simplify the calculation of $D_{line}$, we have exploited the fact that by definition $\|\vec{\delta}_4\|=1$. In some implementations, the distance values are determined as squared distances, e.g. squared geometrical distances, between the estimated position of the mobile device TG and the respective locus. The use of squared distances may reduce the computational effort of the determination since, for example, square root calculations can be avoided.

Referring now to step 105 in FIG. 1, the estimated position of the mobile device TG and the respective distances between that estimated position and the loci is used to determine whether a locus behaves as an outlier or not, i.e. whether the respective locus is reasonable with respect to estimated position. For example, referring to FIG. 9A and FIG. 9B, the respective loci for all five anchor points 1 to 5 are shown, in FIG. 9A in a 3D view and in FIG. 9B in a 2D view, resembling a top view of FIG. 9A. In particular, the two distance spheres of the anchor points 1 and 2 together with the resulting plane locus are shown, as well as the line loci of anchor points 4 and 5 and the point locus of anchor point 3.

Figure 9A:
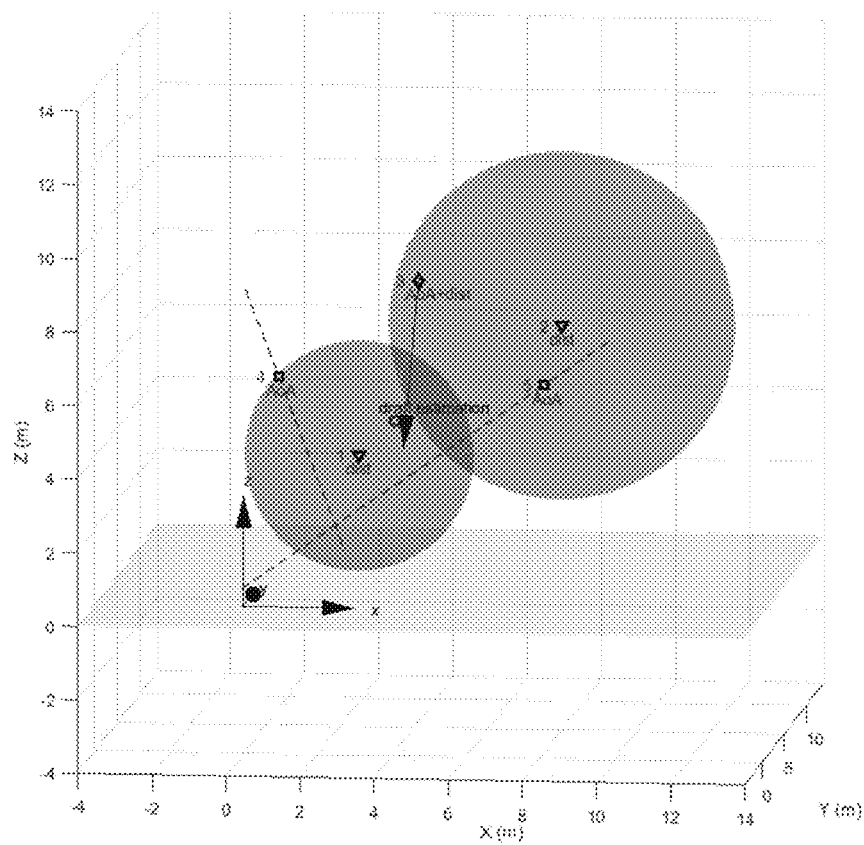
FIGS. 9A and 9B show example 3D and 2D views of anchor points and a mobile device with respective loci.
Figure 9B:
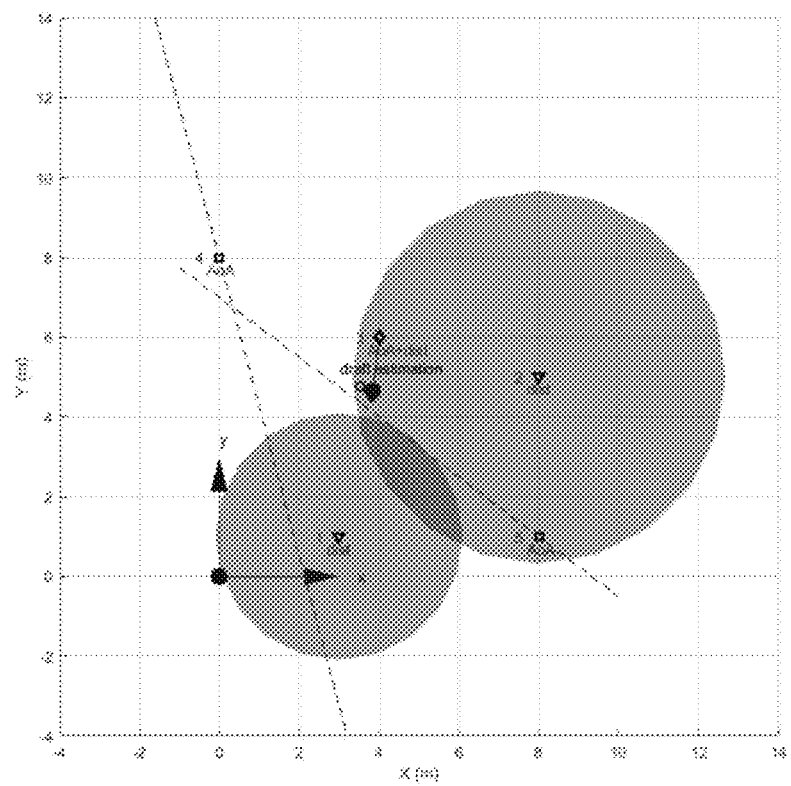

If we look carefully at the room with the five anchor points 1 to 5, we will observe that with respect to the estimated position, called a draft estimation in FIGS. 9A and 9B, of the mobile device TG, the straight line locus, which is defined by anchor point 4, behaves as an outlier. Although anchor point 4 with the corresponding locus line has its own contribution on the determination of the estimated position, together with the other anchor points, it nevertheless can be seen that the LS solution of all the loci has a large distance from the locus of anchor point 4 and makes it suspicious for being an outlier.

Hence, referring back to step 105, the distances of the estimated LS position from all the four loci are used for producing the weights for each one of the rows of the weight matrix W that has been described above in conjunction with equation (11).

The weights are calculated per locus and not per row of the matrix equation (9).

This means that for our example, weight matrix W should have the following form for the present example:

$$W = \begin{bmatrix} w_{12} & 0 & 0 & 0 & 0 & 0 & 0 & 0 \\ 0 & w_3 & 0 & 0 & 0 & 0 & 0 & 0 \\ 0 & 0 & w_3 & 0 & 0 & 0 & 0 & 0 \\ 0 & 0 & 0 & w_3 & 0 & 0 & 0 & 0 \\ 0 & 0 & 0 & 0 & w_4 & 0 & 0 & 0 \\ 0 & 0 & 0 & 0 & 0 & w_4 & 0 & 0 \\ 0 & 0 & 0 & 0 & 0 & 0 & w_5 & 0 \\ 0 & 0 & 0 & 0 & 0 & 0 & 0 & w_5 \end{bmatrix} \Rightarrow W = \quad (16)$$

$$\text{diag}(w_{12}, w_3, w_3, w_3, w_4, w_4, w_5, w_5)$$

Derivation of Weights Based on the Distances

As already has been mentioned, the improved processing concept makes the weights dependent on the distance of the estimated position from each locus. The bigger the distance is, the less should be the reliability (and the weight) of the specific locus.

Let us assume that we treat a room with N anchors (N=5 in our example) of any type, which produce M different loci (M=4 in our example). For each locus $L_i$, $1 \le i \le M$ we calculate the distance $D_i$ according to the equations described above. We define a set of M functions $f_i$: $\mathbb{R}^M \to \mathbb{R}$ that maps the M respective values of $D_i$ to a set of M values of $w_i$, such that $$w_i = f_i(D_1, D_2, \ldots, D_i, \ldots, D_M), 1 \le i \le M \quad (17)$$

There are numerus candidate functions $f_i$, some of which will be described in the following.

Furthermore, we can generalize the concept of the distance $D_i$ and use any monotonicaly increasing function of it, for example the squared $D_i$ as mentioned above. Let us denote as $E_i$ this generalized distance between the estimated position and each locus. For example, it could be:

$$E_i = D_i, E_1 = (D_i)^2, E_i = \sqrt{D_i} \text{etc.}$$

For example, the weight factor $w_i$ for each locus of the set of loci as a function of the determined distance values may be defined as $$w_i = \left[ 1 - \left( \frac{E_i}{E_{threshold} + \sum_{j=1}^{M} E_j} \right)^\mu \right]^\nu, \quad (18)$$

wherein i denotes the associated locus;
M denotes the number of loci;
$E_j$ denotes the distance value for the locus j, e.g. the locus associated with index j;
$E_{threshold}$ denotes a distance threshold value; and
$\mu$, $\nu$ are exponent values with $\rho$, $\nu > 0$.

In an alternative, the weight factor $w_i$ for each locus of the set of loci as a function of the determined distance values may be defined as $$w_i = \left( \frac{E_{threshold} + \min\{E_1, E_2, \ldots, E_i, \ldots, E_M\}}{E_{threshold} + E_i} \right)^\nu, \quad (19)$$

wherein i denotes the associated locus;
M denotes the number of loci;
$E_j$ denotes the distance value for the locus j, e.g. the locus associated with index j;
$E_{threshold}$ denotes a distance threshold value; and
$\nu$ is an exponent value with $\nu > 0$.

In a further alternative, the weight factor $w_i$ for each locus of the set of loci as a function of the determined distance values is defined as $$w_i = \begin{cases} w_{high}, & E_i < E_{threshold} \\ w_{low}, & E_i \ge E_{threshold} \end{cases}, \quad (20)$$

wherein i denotes the associated locus;
$E_i$ denotes the distance value for the locus i;
$E_{threshold}$ denotes a distance a threshold value;
$w_{high}$ denotes a high weight factor; and
$w_{low}$ denotes a low weight factor that is smaller than the high weight factor $w_{high}$.

In an example $W_{high}$ may have a value close to 1 or equal to 1, whereas $w_{low}$ may have a value close to 0 or equal to 0.

The weights that are being generated from the above formulas are in the range $0 \le w_i \le 1$.

The value $E_{threshold}$, where applicable, is a threshold defined from the designer and it expresses the distance limit below which the weight approaches the value "1".

Also, exponents $\mu$, $\nu$, are choice of the designer and they define the dependence of the weights on the distances and their ranges are, for example $\frac{1}{4} \le \mu \le 1$, $1 \le \nu \le 4$.

After the weight factors have been determined in step 105, in step 106 a refined position is determined based on the set of position information and the determined weight factors, e.g. by the WLS approach defined in equation (11), using the weight factor of the form described in equation (16).

Optionally, the method may be performed in an iterative fashion. For example, after the refined position has been determined, in a next iteration step it is continued at step 104 by determining distance values from the loci to the refined position of the mobile device TG. For example, in an initial iteration step the estimated position is determined based on the set of position information, and in each subsequent iteration step the refined position determined in a respective preceding iteration step is used as the estimated position for determining the distance values and the weight factors. The number of iterations may be predetermined and/or the iteration stops when some exit criterion is fulfilled.

Referring now to FIGS. 10 to 13, several examples of cumulative distribution functions, CDF, of localization errors with respect to corresponding ground truth positions according to the improved processing concept are shown. In these FIGS. 10 to 13, the "draft" line refers to the estimated position of the mobile device, the $1^{st}$ iteration refers to the refined position with the first application of the weight factors, and the $2^{nd}$ iteration refers to the refined position with the second application of the weight factors.

Figure 10:
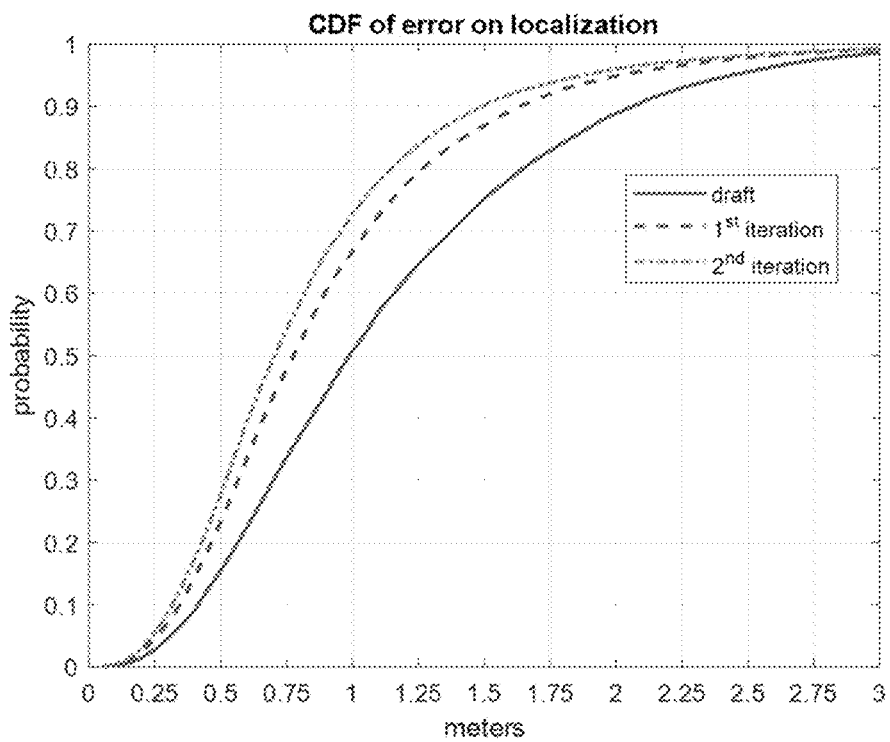
FIGS. 10 to 13 show examples of cumulative distribution functions of localization errors.

For example, the CDF shown in FIG. 10 corresponds to weight factors being determined according to equation (18) with $\mu=\frac{1}{2}$ and $\nu=2$. It can be seen that the probability for smaller localization errors can be severely improved with a single iteration and further improved with a second iteration, as described above. The CDF of FIG. 10 corresponds to a scenario where the mobile device TG is moving around the room, which for example is a typical office environment.

Figure 11:
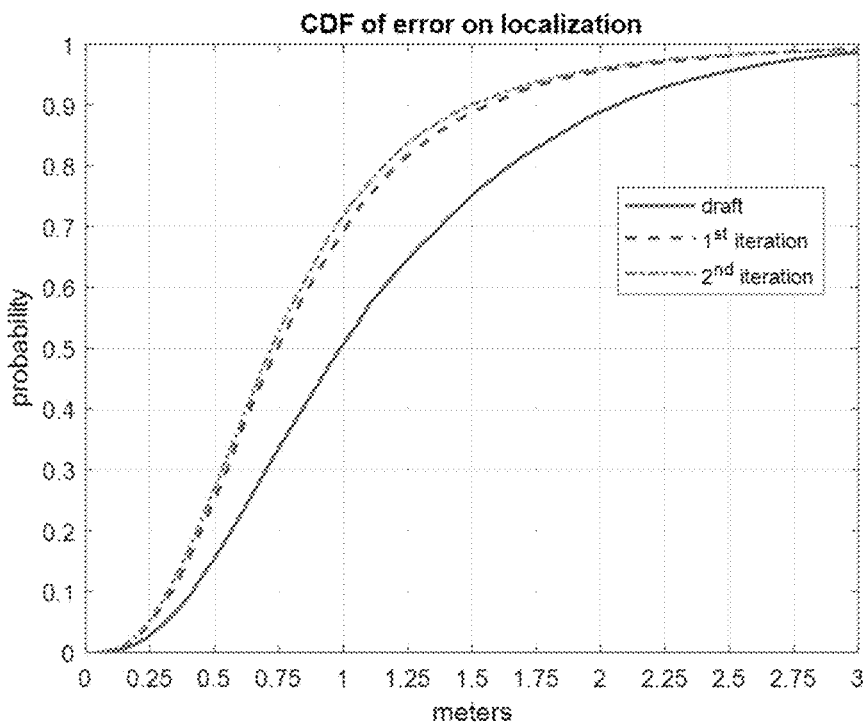

Simulating the same scenario but using the formula of equation (19) with $\nu=2$, we get the performance results shown in FIG. 11.

For both approaches, $$E_{threshold} = 0.1$$

has been used. We can observe that the improvement of the confidence level of e.g. 90% is more than 0.5 m.

Figure 12:
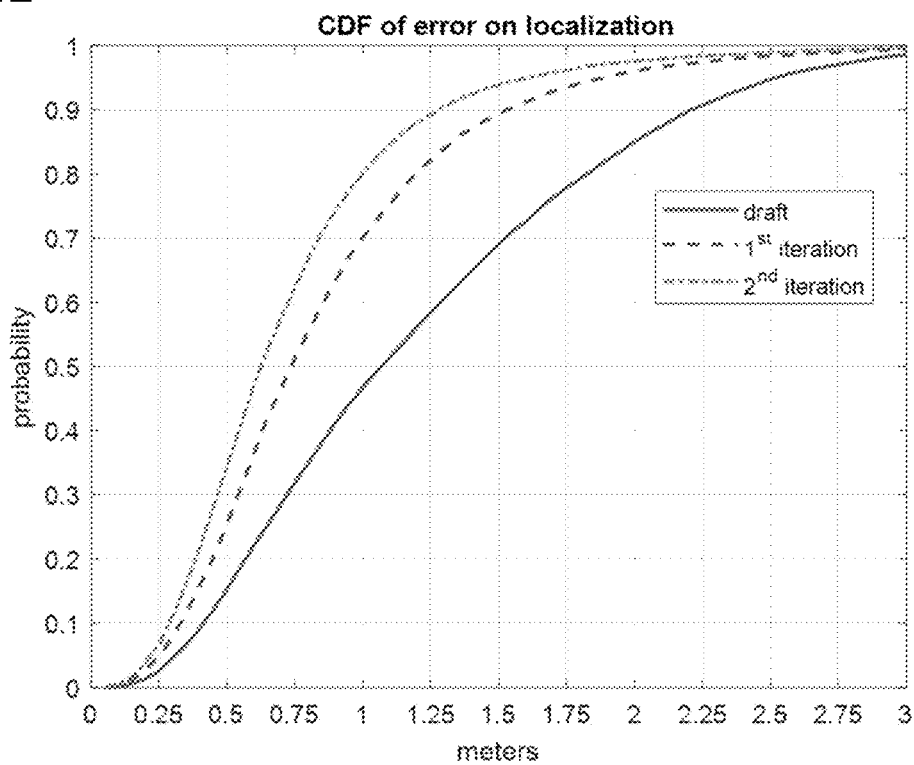
Figure 13:
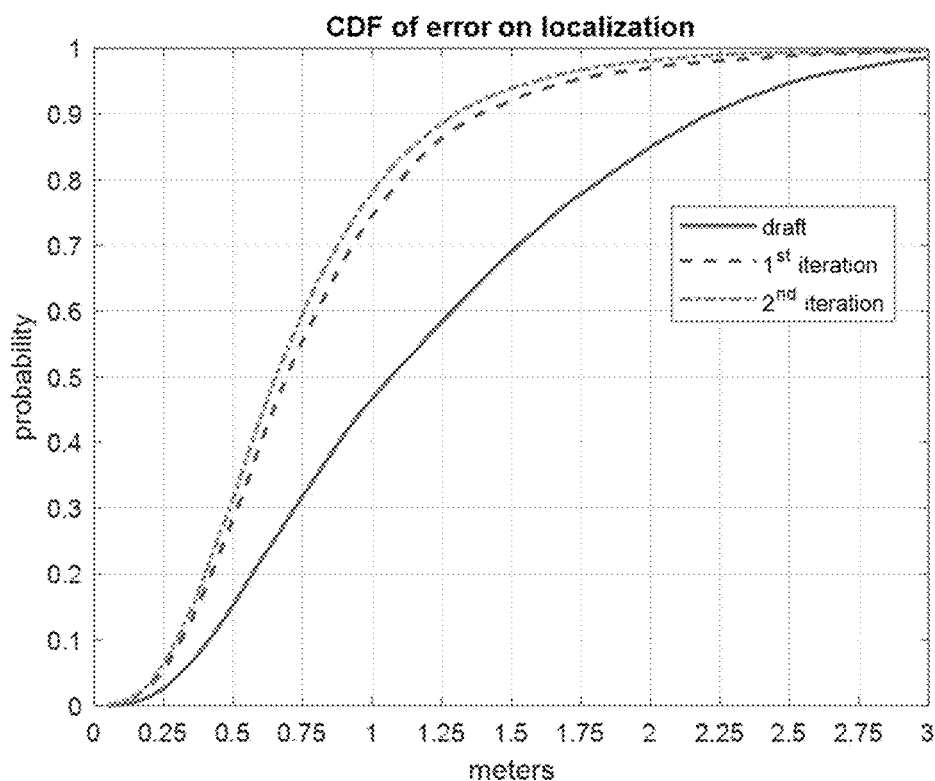

If we repeat the previous two measurements in the same office environment, but the mobile device follows the path that always one or two of the anchor points are in a non-line-of-sight condition or suffer a strong multipath, then the improvement is even more evident, as can be seen in FIGS. 12 and 13. In particular, FIG. 12 is based on equation (18) for the weight calculation and FIG. 13 is based on equation (19) for the weight calculation.

In addition to the weight factors as described above, in some implementations the refined position of the mobile device TG may be determined further based on quality information for at least one of the plurality of anchor points.

For example, this quality information can be expressed in one or more further weight matrices that are applied to the WLS algorithm.

For example, the quality information for the at least one anchor point is determined from at least one of the following:
- a signal strength, e.g. RSSI, associated with the received relative position of the at least one anchor point;
- a number of antenna elements of the at least one anchor point; a higher number increases accuracy;
- a confidence factor associated with the received relative position of the at least one anchor point;
- upper and/or lower bounds for the weight factor associated with the at least one anchor point.

Various embodiments of the improved processing concept can be implemented in the form of logic in software or hardware or a combination of both. The logic may be stored in a computer readable or machine-readable storage medium as a set of instructions adapted to direct a processor of a computer system to perform a set of steps disclosed in embodiments of the improved processing concept. The logic may form part of a computer program product adapted to direct an information-processing device to automatically perform a set of steps disclosed in embodiments of the improved processing concept.

The specification and drawings are, accordingly, to be regarded in an illustrative rather than a restrictive sense. However, it will be evident that various modifications and changes may be made thereunto without departing from the scope of the invention as set forth in the claims.

LIST OF REFERENCE SIGNS

100 method for determining a position of a mobile device
101-106 steps
1-5 anchor points
TG mobile device
RX receiver
PROC processing unit
LPE positioning engine

The invention claimed is:

1. A method for determining a position of a mobile device, the method comprising:
   for each of a plurality of anchor points, receiving respective relative position information between the respective anchor point and the mobile device such that the received relative position information for the plurality of anchor points forms a set of position information, each relative position information including at least one of:
   - a direction between the respective anchor point and the mobile device;
   - a distance between the respective anchor point and the mobile device;
   - a direction and a distance between the respective anchor point and the mobile device;

determining an estimated position of the mobile device based on the set of position information;

defining a set of loci, each locus of the set of loci being based on one or more of the relative position information from the set of position information;

determining, for each locus of the set of loci, a distance value between the estimated position of the mobile device and the respective locus;

determining, for each locus of the set of loci, a weight factor $w_i$ as a function of the determined distance values; and determining a refined position of the mobile device based on the set of position information and the determined weight factors.

2. The method according to claim 1, wherein
   determining the estimated position of the mobile device is performed with a linear equation system solved with a Least-Squares approach; and
   determining the refined position of the mobile device is performed with the linear equation system solved with a weighted Least-Squares approach based on the determined weight factors.

3. The method according to claim 1, wherein the distance values are determined as squared distances between the estimated position of the mobile device and the respective locus.

4. The method according to claim 1, wherein the function determining the weight factor for each locus of the set of loci as a function of the determined distance values is monotonically decreasing or strictly decreasing with respect to the associated distance value of the respective locus.

5. The method according to claim 1, wherein the weight factor $w_i$ for each locus of the set of loci as a function of the determined distance values is defined as $$w_i = \left[1 - \left(\frac{E_i}{E_{threshold} + \sum_{j=1}^{M} E_j}\right)^{\mu}\right]^{\nu},$$

wherein
i denotes the associated locus;
M denotes the number of loci;
$E_j$ denotes the distance value for the locus j;
$E_{threshold}$ denotes a distance threshold value; and
$\mu$, $\nu$ are exponent values with $\mu, \nu > 0$.

6. The method according to claim 1, wherein the weight factor $w_i$ for each locus of the set of loci as a function of the determined distance values is defined as $$w_i = \left(\frac{E_{threshold} + \min\{E_1, E_2, \ldots, E_i, \ldots, E_M\}}{E_{threshold} + E_i}\right)^{\nu},$$

wherein
i denotes the associated locus;
M denotes the number of loci;
$E_j$ denotes the distance value for the locus j;
$E_{threshold}$ denotes a distance threshold value; and
$\nu$ is an exponent value with $\nu > 0$.

7. The method according to claim 1, wherein the weight factor $w_i$ for each locus of the set of loci as a function of the determined distance values is defined as $$w_i = \begin{cases} w_{high}, & E_i < E_{threshold} \\ w_{low}, & E_i \geq E_{threshold} \end{cases},$$

wherein
i denotes the associated locus;
$E_i$ denotes the distance value for the locus i;
$E_{threshold}$ denotes a distance threshold value;
$w_{high}$ denotes a high weight factor; and
$w_{low}$ denotes a low weight factor that is smaller than the high weight factor $w_{high}$.

8. The method according to claim 1, wherein the refined position of the mobile device is determined further based on quality information for at least one of the plurality of anchor points.

9. The method according to claim 8, wherein the quality information for the at least one anchor point is determined from at least one of the following:
   a signal strength associated with the received relative position of the at least one anchor point;
   a number of antenna elements of the at least one anchor point;
   a confidence factor associated with the received relative position of the at least one anchor point;
   upper and/or lower bounds for the weight factor associated with the at least one anchor point.

10. The method according to claim 1, wherein the method is performed in an iterative fashion such that:
    in an initial iteration step the estimated position is determined based on the set of position information; and
    in each subsequent iteration step the refined position determined in a respective preceding iteration step is used as the estimated position for determining the distance values and the weight factors.

11. The method according to claim 1, wherein an absolute position of each of the plurality of anchor points is known.

12. The method according to claim 1, wherein the method is performed in a positioning engine.

13. A positioning engine for determining a position of a mobile device, the positioning engine comprising:
    a receiver configured for receiving from each of a plurality of anchor points respective relative position information between the respective anchor point and the mobile device such that the received relative position information for the plurality of anchor points forms a set of position information, each relative position information including at least one of:
      a direction between the respective anchor point and the mobile device;
      a distance between the respective anchor point and the mobile device;
      a direction and a distance between the respective anchor point and the mobile device; and
    a processing unit configured for:
      determining an estimated position of the mobile device based on the set of position information;
      defining a set of loci, each locus of the set of loci being based on one or more of the relative position information from the set of position information;
      determining, for each locus of the set of loci, a distance value between the estimated position of the mobile device and the respective locus;
      determining, for each locus of the set of loci, a weight factor as a function of the determined distance values; and
      determining a refined position of the mobile device based on the set of position information and the determined weight factors.

14. At least one tangible, non-transitory, machine-readable media storing one or more instructions that, when executed by one or more processors, cause the one or more processors to perform operations comprising:
    for each of a plurality of anchor points, receiving respective relative position information between the respective anchor point and the mobile device such that the received relative position information for the plurality of anchor points forms a set of position information, each relative position information including at least one of:
      a direction between the respective anchor point and the mobile device;
      a distance between the respective anchor point and the mobile device;
      a direction and a distance between the respective anchor point and the mobile device;
    determining an estimated position of the mobile device based on the set of position information;
    defining a set of loci, each locus of the set of loci being based on one or more of the relative position information from the set of position information;
    determining, for each locus of the set of loci, a distance value between the estimated position of the mobile device and the respective locus;
    determining, for each locus of the set of loci, a weight factor $w_i$ as a function of the determined distance values; and
    determining a refined position of the mobile device based on the set of position information and the determined weight factors.

* * * * *